United States Patent [19]

Freedman et al.

[11] 3,839,780

[45] Oct. 8, 1974

[54] METHOD OF INTERMETALLIC BONDING

[75] Inventors: George Freedman, Wayland, Mass.; Max F. Vogelsang, deceased, late of Buckfield, Maine Caroline B. Vogelsang, special administratrix

[73] Assignee: Raytheon Company, Lexington, Mass.

[22] Filed: Apr. 14, 1971

(Under Rule 47)

[21] Appl. No.: 134,053

[52] U.S. Cl. .................... 29/501, 29/498, 29/502, 29/503, 29/504
[51] Int. Cl. ............................................. B23k 35/12
[58] Field of Search ........... 29/504, 503, 502, 498, 29/488, 501; 317/234–235.2

[56] References Cited
UNITED STATES PATENTS

| | | | |
|---|---|---|---|
| 2,169,659 | 8/1939 | Nobel | 29/501 |
| 2,232,176 | 2/1941 | Guthrie | 29/502 X |
| 2,585,393 | 2/1952 | Lyle | 75/170 |
| 2,733,168 | 1/1956 | Hodge et al. | 29/503 |
| 2,735,050 | 2/1956 | Armstrong | 29/504 X |
| 2,737,711 | 3/1956 | Smith | 29/504 X |
| 2,846,762 | 8/1958 | Walker et al. | 29/504 X |
| 3,063,145 | 11/1962 | Bouton | 29/503 |
| 3,110,089 | 11/1963 | Hill | 29/504 X |
| 3,141,238 | 7/1964 | Harmon, Jr. | 29/498 |
| 3,165,403 | 1/1965 | Treaftis et al. | 29/504 X |
| 3,236,696 | 2/1966 | Andre | 29/502 X |
| 3,290,170 | 12/1966 | Houston | 117/131 |
| 3,305,356 | 2/1967 | Youdelis | 75/134 |
| 3,372,476 | 3/1968 | Peiffer et al. | 29/502 X |
| 3,495,972 | 2/1970 | Baum | 75/0.5 |
| 3,590,467 | 7/1971 | Chose et al. | 29/502 X |
| 3,632,410 | 1/1972 | Vargo | 29/498 X |

FOREIGN PATENTS OR APPLICATIONS

| | | | |
|---|---|---|---|
| 589,689 | 12/1959 | Canada | 29/503 |

*Primary Examiner*—J. Spencer Overholser
*Assistant Examiner*—Ronald J. Shore
*Attorney, Agent, or Firm*—Milton D. Bartlett

[57] ABSTRACT

An intermetallic compound of a metal such as mercury, gallium or indium plus one of the more nobel metals such as copper, gold, nickel, silver or palladium which is utilized for bonding together two metals without the use of any flux or binder so that an excellent thermally and electrically conductive bond is formed. Methods of producing the bonding agent and fabricating structures therewith are disclosed.

5 Claims, No Drawings

METHOD OF INTERMETALLIC BONDING

BACKGROUND OF THE INVENTION

In the past, metals have been joined by a variety of methods, for example, mechanically connecting two sheets of metal by means of bolts, by heating procedures such as fusing, welding, brazing, and soldering or by bonding the metals together utilizing materials such as glues, cement, glyptals and epoxies. In certain applications such as the fastening of small electronic components, bolting is impractical due to the physically small size of the components, such as the leads of transistors; fusing, brazing and welding are impractical because of the high temperatures required which, as is well known, may damage an electronic element such as a transistor if such heat is applied too close to a semiconductor junction; and the use of glues, cements and similar products is contraindicated due to the poor thermal and electrical conductivity of the bond. In addition, there is the problem that both fluxes and glues produce vapors and contaminants especially in high vacuum applications. While soldering is extensively employed, due to the relatively lower temperatures utilized in its application, still there is a requirement that the high temperature be applied at greater than some minimum distance from a semiconductor junction and for a limited period of time. Thus, it is seen that where a metallic bond is utilized for good thermal and electrical conductivity, there is a problem in that extensive heating is required to accomplish the bonding. On the other hand, when cements and similar materials are utilized for the bonding, the temperature problem does not exist but there is a poor thermal and electrical conductivity to the bond.

SUMMARY OF THE INVENTION

The foregoing problems are overcome by the present invention wherein an amalgam or intermetallic compound is formed of a metal such as mercury, gallium or indium plus one of the more noble metals such as copper, gold, nickel, silver or palladium which is utilized for bonding together two metal surfaces to provide an excellent thermally and electrically conductive bond. The amalgam which, by way of example may utilize gallium and copper, is formed in accordance with one aspect of the invention in a two part operation. In the first part the gallium is melted to form liquid gallium to which is added copper in powdered form. Agitation is then applied for sufficient time to obtain wetting of the copper powder. To complete the first part, any interaction of the copper and gallium which has been initiated is now arrested by chilling and solidifying the mixture of the gallium and the copper. The partially amalgamated material may now be kept indefinitely at reduced temperatures until needed. The second part of the amalgamation occurs during the actual bonding of the two metals. Thus, to bond a metallic electrode to a metallic surface, the metallic electrode and the metallic surface are warmed slightly and the partially amalgamated material applied thereto. The gallium in the mixture of the gallium and the copper readily melts at this slightly elevated temperature so that the gallium wets all the surfaces whereupon the amalgamation of the copper and gallium proceeds to form a solid material which bonds the metallic electrode to the metallic surface. Thus, there is formed an electrically and thermally conductive bond at approximately room temperatures that preserve a semiconductor junction.

DESCRIPTION OF THE PREFERRED EMBODIMENT

Intermetallic compounds are well known, the most commonly known being that of the amalgam $Ag_2Hg_3$ utilized in dental fillings. Intermetallic compounds have great shear and compression strength while being relatively weak in flexure and tension. Due to their relatively high melting point they may be utilized in many applications requiring elevated temperatures. In spite of their relatively high melting point, they may be formed at room temperatures or at moderate temperatures (below their melting points) by selecting one of the elements of the intermetallic compound, namely, the element having the lowest melting point and utilizing this element as a solvent for dissolving the other elements of which the compound is formed. Thus, mercury, a liquid at room temperature, is utilized by dentists to dissolve silver, a solid at room temperature, to form the silver amalgam $Ag_2Hg_3$ which, being a solid at room temperature, precipitates out of the mercury solvent thereby reducing the concentration of metallic silver in solution and permitting the further dissolving of the silver and further precipitation of the silver amalgam.

This procedure is not limited to simply mercury and silver, but may employ such metals as gallium or indium as the solvent for dissolving metals in a solid state such as copper, gold, nickel, silver or palladium to form intermetallic compounds of the solvent elements and one of the noble metals. Of particular interest is the fact that solvents such as gallium and mercury have excellent wetting capability, a capability so strong that the solvents are able to penetrate through defects in metallic oxides such as the oxide films covering copper or even aluminum to enable a reaction of the solvent with the copper or aluminum. The properties of high temperature melting point, good shear and compression strength, and the penetrating wetting ability of the solvent will now be shown, in accordance with the invention, to be of great use in fabricating structures which are formed by the joining of various metallic structural members, as well as in forming thermally and electrically conductive bonds ideally suited for electronic circuits. In both of these situations, namely, the fabrication of structures and of electronic circuits, metallic objects will be bonded together by using intermetallic compounds as the bonding agent.

The bond is formed by placing the elemenets from which the intermetallic compound is to be formed in an unamalgamated or partially amalgamated state within a space between the metallic objects which are to be bonded. Then these elements are permitted to further amalgamate to form the intermetallic compound such that during this formation process the solvent reacts with these metallic objects to form a continuum of intermetallic compounds comprising compounds of the solvent with the metals to be joined as well as the metals to be utilized in the bond.

The choice of metallic elements to be utilized depends on the environmental temperature in which the fabrication is to take place and also on the particular metals to be joined. As is shown in the well known treatise on metals, Constitution of Binary Alloys by Max Hansen, McGraw Hill Book Company, 1958, there are numerous metallic systems, the ones of greatest interest being intermetallic compounds and eutectics. For example, an intermetallic compound would not be formed from gallium and tin; tin, rather than gallium, is utilized as a solvent in a high temperature amalgamation process, gallium and tin form a eutectic system. However, the addition of a small amount of tin to liquid gallium is quite useful for forming the intermetallic compound of gallium and copper since the addition of the small amount of tin lowers the melting point of the gallium so that the dissolving of the copper by the gallium liquid can be done conveniently at temperatures as low as 68°F. In the absence of the tin this dissolving would take place at slightly elevated temperatures, namely, temperatures in excess of 86°F. If it is desirable to use a solvent with a still higher melting point, then indium may be a suitable solvent in which case intermetallic compounds such as that of indium and copper may be formed. It is interesting to note that many of these intermetallic compounds are formed from the interaction of an electropositive metal with an electronegative metal, with covalent bonding.

In order to perform the fabrication of a metallic structure by bonding two metallic structural members together, as has been noted above, it is necessary to insert in the space between the two metallic structural members the appropriate mixture of the elements from which the intermetallic compound is to be formed in such a manner that little or no amalgamation of these elements occurs until the structural members have been positioned. Accordingly, in accordance with the invention, three principal methods of applying these elements in an arrested state of amalgamation will now be described. The first method utilized a frozen mixture of one of the afore-mentioned higher melting point elements (copper, gold, nickel, silver or palladium) in a carrier such as gallium or indium. By simply allowing this solid mixture to warm up to a room temperature or higher temperature (86°F for gallium, 311°F for indium) the necessary wetting of the metallic structural members occurs and the amalgamation of these elements proceeds with the resultant formation of the intermetallic bond. In the second method one of the elements of the intermetallic compound is provided in the form of small particles with an exterior coating which prevents interaction with the other elements of the intermetallic compound; this coating being, by way of example, a copper oxide surrounding copper particles or gallium oxide surrounding gallium particles in a mixture of gallium and copper. This mixture is to be later amalgamated into an intermetallic compound, the amalgamation proceeding after the coatings are fractured as by abrading the mixture to rupture the coating and then warming the mixture. The third method of applying the elements to a metallic structural member is to electroplate simultaneously the various elements by means of an electroplating solution having a temperature below the melting point of any of any of these elements to form a coating of a mixture of these elements on the structural number and retaining the member below their melting points.

These methods are not described in greater detail. A frozen mixture of the elements for the intermetallic compound is conveniently produced as follows. First the element to be used in a liquid phase such as gallium is melted and any ingredient such as tin for altering the melting point is added and dissolved in the gallium. Then the element of the intermetallic compound having the high melting point, such as copper, is provided in powdered form and is added to the liquid gallium to provide a mush which is conveniently mixed by the use of a dental amalgam shaker. Agitation of this mush is then provided for a sufficient time to obtain complete wetting of the copper powder whereupon the mush is immediately frozen to arrest any further interaction of the copper and gallium. The freezing of the mush is preferably accomplished in a mold which provides a convenient shape to the solid mass, as for example the shape of a rod or bar. The solid material may then be stored at a temperature such as that commonly employed for the storage of food in a refrigerator; and even at slightly warmer temperatures such as room temperature, the rate of diffusion of copper and solid gallium is so slow that, as a practical matter, the arrested state of amalgamation can be retained indefinitely. Temperatures below 80°F may be used for the storage of a mush of gallium and copper while temperatures below 60°F may be used for the copper gallium mush including a small amount of tin which lowers the melting point.

The bar of solid mush may be readily applied in the fabrication of a metallic structure. Since the intermetallic compound of gallium and copper $Ga_2Cu$ is strong in shear but weak in tension, a lap joint is preferred to a butt joint for the joining of two structural members so that any resulting structural forces are applied in a direction parallel to the plane of the lap joint thereby setting up shear stresses rather than tensile stresses in the intermetallic compound of the bond. The two structural members are bonded by applying the bar of solid mush to a structure of one member which is preferably at a slightly elevated temperature, as for example, simply the temperature of the human body, although a layer of the mush is more rapidly applied by raising the temperature of the structural member to a temperature such as 140°F analogously to the buttering of a frying pan prior to the frying of an egg. The coated member is then brought in contact with the other member which is also at a slightly elevated temperature such as 100°F, and the mush, thus having been liquidified, spreads between the two members along their interface and wets both members as the amalgamation of the copper and gallium proceed. Structural members of a metal such as copper are well suited for this fabrication procedure. Iron members have also been utilized but the resulting bond was not as good as that obtained with the copper members. No bonding was obtained with stainless steel members, the lack of bonding being due, possibly, to an impermeability of the oxide of chromium $Cr_2O_3$.

The spreadability of the mush as it is applied to coat the structural member depends on the particle size of the powdered copper which was originally dissolved in the gallium; a particle size of 325 mesh or smaller is recommended for good spreadability. The speed at which the amalgamation takes place depends on the temperatures of the two members as well as on the particle size. With both members held at a temperature of approximately 100°F the amalgamation process takes approximately 2 hours while at a temperature of approximately 90°F the amalgamation process takes approximately 3 hours for the above particle size. Upon completion of the amalgamation the two structural members are held together with the rigid bond. In industrial applications where rapid amalgamation is required, as for example in automated assembly procedures, an elevated temperature such as 180°F may be utilized.

As an alternative procedure in providing a bar of solid mush, solid gallium which is a brittle material is ground into particles on the order of 100 mesh or smaller in a ball mill which is maintained at a temperature below the melting point of gallium. The powdered gallium is then taken from the ball mill and placed in a silvering bath which is also maintained at a temperature below the melting point of gallium. Silver is deposited upon each of these particles and forms a coating or cocoon about each of the particles. It is preferable to use a slight excess of gallium so that later, when the mush has melted, there is sufficient gallium to provide a rapid wetting of the structural members which are to be joined. In this example the intermetallic compound is of silver and gallium, namely, $Ag_3Ga_2$.

It should also be noted that it is not necessary for the amalgamation to proceed to completion. That is, for example, if there is insufficient gallium to dissolve all the copper or all of the silver, then the resulting bond has a form of a matrix of $Ga_2Cu$ surrounding particles of copper or a matrix of $Ag_3Ga_2$ surrounding particles of silver. This is analogous to a matrix of concrete which surrounds pebbles embedded in the matrix. As with the analogy of concrete, the compression and shear strength of the amalgam are retained even though the amalgamation is not complete.

With respect to the use of the alternative mixture of the silver coated gallium particles, the mixture is applied between the surfaces of the structural members to be joined and then the structural members are pressed together thereby fracturing the silver cocoons to liberate the gallium so that it can wet the metallic surfaces of the structural members.

These intermetallic compounds are also useful in that they have a low vapor pressure. Since they will adhere to both metallic as well as some nonmetallic surfaces they may be utilized in such applications as sealing openings in vacuum chambers. The atomic numbers of these elements are sufficiently low so as to preclude effects of nuclear radiation.

The bonding material may be prepared by coating granules of the material with an oxide to retain the arrested state of the amalgamation. This is accomplished by cooling the solid mush in liquid nitrogen which renders it extremely brittle. The material is then fragmented, as by a ball mill, to a finely divided state consisting of particles of gallium containing a small amount of copper and particles of copper surrounded by a coating of gallium. In the course of this fragmentation an oxide is formed on all the exposed gallium surfaces. This oxide serves to isolate the particles from each other, and in this role is effective in inhibiting further reaction of the gallium and the copper even at temperatures substantially above normal room ambient temperatures. In the fabrication of structures this material is applied to structural members for bonding these members by means of a suitable dispersing fluid, as for example, nitrocellulose in diethyl carbonate, and this form may be spread as a paint, which when allowed to dry leaves a coherent film having particles lightly bound together and bound to the metal surfaces by virtue of the nitrocellulose component. As a final step, this film is physically abraded so that the particles of gallium and gallium coated copper are stripped free of their protective coating of oxide whereupon they mingle together promoting the interaction of the gallium and the copper and the wetting of the metal surfaces. This phenomenon is physically observable by a transformation in appearance of the coating from a dull gray to a light silvery color. Once the interaction of the gallium and copper have thereby been sufficiently stimulated, the reaction proceeds spontaneously at room temperature and at a faster rate at elevated temperatures, culminating in a dry hard brittle bond between the metallic surfaces.

It is noted that this bonding material differs from those in common use in that it is nonorganic and, in this respect, differs from ordinary glues, cements and epoxies. Secondly, it is applied under conditions of room ambient temperatures (or other temperatures if desired), and in this respect differs from other metal joining products as for example, solders and brazers. Also, when fully hardened it will remelt only at temperatures considerably higher than those used for curing. In this respect it is particularly useful for materials such as the cases of semiconductor elements which are frequently attached to heat sink devices as in transistorized power supplies where the interconnection of the transistor and the heat sink must be accomplished in a manner which does not involve excessive heating of the transistor.

Another fabrication technique involves the coating of structural members at the time of their manufacture, the coating being done either by melting a portion of the solid mush and spreading it along the surface of the structural members or, alternatively, by electroplating elements such as gallium and copper onto the structural member at a temperature below the melting point of these elements. The structural members are then stored at reduced temperatures until such time as the structure is to be fabricated. Fabrication is then accomplished by simply affixing all of these structural members in their proper positions whereupon the environmental temperature is raised and the bonding of all these members is accomplished.

Of particular interest is the fabrication of aluminum structures from aluminum structural elements. As is well known aluminum is normally covered with a tenacious coating of aluminum oxide which greatly complicates the procedure of effecting a metal to metal bond between two aluminum members. For example, in the case of the brazing of aluminum, a hot fluoride flux is utilized to absorb this coating so that metal to metal contact can be obtained. For example, a simple soldering operation at room temperature and without a strong fluxing agent of aluminum is unknown. However, following the procedures of the present invention which utilizes metallic liquids such as gallium, the superior wetting ability of gallium permits penetration by the gallium of even aluminum oxide with the result that a metal to metal bond can be obtained. Thus, where a solid mush of gallium and copper is to be employed for the bonding of aluminum structural members in fabricating an aluminum structure, intermetallic compounds of aluminum-copper and gallium-copper are formed. It is also noted that since gallium preferentially attacks the grain boundaries in aluminum it is advisable to dissolve a small amount of aluminum in the gallium liquid during the formation of the mush, since this small amount of aluminum in solutions inhibits excessive penetration of the gallium into the aluminum grain boundaries. Thus, there is provided, in accordance with the invention, a metal to metal bonding of aluminum at room temperature, a bonding heretofore unobtainable.

It is understood that the above described embodiments of the invention are illustrative only and that modifications thereof will occur to those skilled in the art. Accordingly, it is desired that this invention is not to be limited to the embodiments disclosed herein, but is to be limited only as defined by the appended claims.

What is claimed is:

1. In an intermetallic compound system, a bond formed by the method of:
   melting a first element of said intermetallic compound;
   forming particles of a second element of said intermetallic compound;
   immersing said particles in said molten first element to form a mixture of said molten first element and said particles;
   cooling said mixture to a lower temperature to arrest an interaction between said first element and said second element to provide said bonding agent; and
   applying said mixture to an interface of two metal members at a temperature above said lower temperature to form a bond between said two members.

2. The bond according to claim 1 further including the step of dissolving a third element in said molten first element prior to said cooling, said third element being of a eutectic system which includes said first element.

3. In an intermetallic compound system a bond formed by:
   fragmenting a mixture of two constituents of an intermetallic compound system, one of said constituents having a higher melting point than the other;
   applying said fragmented mixture by a fluidic vehicle to the interface between two objects to be bonded; and
   abrading said mixture to stimulate an interaction between said constituents and the materials of said objects to form said bond.

4. The bond of claim 3 wherein particles of said fragmented mixture are covered with an oxide coating.

5. A bonding of aluminum comprising the steps of:
   storing a solid material at a temperature below room temperature, said solid material comprising elements of a class of elements which interact at room temperature to form an intermetallic compound system, said interaction being arrested at said storing temperature;
   inserting said material along an aluminum interface; and
   curing said material at room temperature to form said intermetallic bonding of aluminum, said cured material consisting essentially of aluminum, gallium and copper.

* * * * *